(12) United States Patent
Plantenberg et al.

(10) Patent No.: US 9,325,712 B2
(45) Date of Patent: *Apr. 26, 2016

(54) UNIFIED USER IDENTIFICATION WITH AUTOMATIC MAPPING AND DATABASE ABSENCE HANDLING

(71) Applicant: INTERNATIONAL BUSINESS MACHINES CORPORATION, Armonk, NY (US)

(72) Inventors: Demyn Lee Plantenberg, Sunnyvale, CA (US); Frank B. Schmuck, Campbell, CA (US); Yuri Volobuev, Champaign, IL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/147,675

(22) Filed: Jan. 6, 2014

(65) Prior Publication Data

US 2014/0123226 A1    May 1, 2014

Related U.S. Application Data

(63) Continuation of application No. 13/768,127, filed on Feb. 15, 2013, now Pat. No. 8,700,664, which is a continuation of application No. 13/425,019, filed on Mar. 20, 2012, now Pat. No. 8,447,780, which is a (Continued)

(51) Int. Cl.
*G06F 7/00* (2006.01)
*G06F 17/30* (2006.01)

(Continued)

(52) U.S. Cl.
CPC .......... *H04L 63/10* (2013.01); *G06F 17/30091* (2013.01); *G06F 17/30557* (2013.01); *G06F 21/6236* (2013.01)

(58) Field of Classification Search
None
See application file for complete search history.

(56) References Cited

U.S. PATENT DOCUMENTS 6,446,253 B1    9/2002  Mellmer
6,732,172 B1    5/2004  House et al.
(Continued)

OTHER PUBLICATIONS

Notice of Allowance in U.S. Appl. No. 12/549,205 mailed on Aug. 19, 2011, 24 pages (pp. 1-24 in pdf).

(Continued)

*Primary Examiner* — Tuan A Pham
(74) *Attorney, Agent, or Firm* — Mitch Harris, Atty at Law, LLC; Andrew M. Harris; Parashos T. Kalaitzis

(57) ABSTRACT

An identification system that may be used in heterogeneous computing environments provides a fail-free path to providing identifiers from a single canonical namespace. Objects or gateways requiring an identifier for access are accessed using an identifier for the canonical namespace. If an entity requests access using an identifier from another namespace, an external database is consulted to determine if a mapping exists for the identifier to another identifier the canonical namespace. If no mapping exists, or the external database is unavailable, then an identifier is automatically generated in the canonical namespace and is used for the access. An internal database is updated with the automatically generated identifier, providing a mechanism to add mappings without administrative intervention. To access resources requiring an identifier from another particular namespace, a canonical namespace identifier may be mapped to another identifier in the particular namespace, or a generic identifier may be used.

9 Claims, 3 Drawing Sheets

Related U.S. Application Data continuation of application No. 13/287,189, filed on Nov. 2, 2011, now Pat. No. 8,180,794, which is a continuation of application No. 12/549,205, filed on Aug. 27, 2009, now Pat. No. 8,086,633.

(51) Int. Cl.
*H04L 29/06* (2006.01)
*G06F 21/62* (2013.01)

(56) References Cited

U.S. PATENT DOCUMENTS

| | | | |
|---|---|---|---|
| 7,017,183 | B1 | 3/2006 | Frey et al. |
| 7,672,945 | B1 | 3/2010 | Chatterjee et al. |
| 7,730,089 | B2 * | 6/2010 | Campbell et al. ............ 707/781 |
| 8,086,633 | B2 | 12/2011 | Plantenberg et al. |
| 8,180,794 | B2 | 5/2012 | Plantenberg et al. |
| 8,312,046 | B1 * | 11/2012 | Eisler ............... G06F 17/30091 707/609 |
| 2002/0112045 | A1 * | 8/2002 | Nirkhe et al. ............... 709/223 |
| 2003/0028808 | A1 | 2/2003 | Kameda |
| 2003/0237002 | A1 | 12/2003 | Oishi et al. |
| 2004/0181696 | A1 * | 9/2004 | Walker ............... H04L 63/0846 726/6 |
| 2005/0005260 | A1 | 1/2005 | Antonov et al. |
| 2008/0126369 | A1 | 5/2008 | Ellard |
| 2008/0205655 | A1 * | 8/2008 | Wilkins ............... G06Q 10/10 380/279 |
| 2008/0263640 | A1 | 10/2008 | Brown |
| 2008/0281967 | A1 | 11/2008 | Muhlestein et al. |
| 2009/0030957 | A1 | 1/2009 | Manjunath |
| 2009/0177756 | A1 | 7/2009 | Gunda et al. |

OTHER PUBLICATIONS

Notice of Allowance in U.S. Appl. No. 13/287,189 mailed on Jan. 10, 2012, 32 pages (pp. 1-32 in pdf).
Notice of Allowance in U.S. Appl. No. 13/425,019 mailed on Jan. 17, 2013, 20 pages (pp. 1-20 in pdf).
Notice of Allowance in U.S. Appl. No. 13/768,127 mailed on Dec. 3, 2013, 21 pages (pp. 1-21 in pdf).
Ryutov, "Representation and Evaluation of Security Policies for Distributed System Services", Proceedings of DARPA Information Survivability Conference, Jan. 2000, pp. 172-183, Hilton Head, SC.
U.S. Appl. No. 13/425,019, filed Mar. 20, 2012, Plantenberg, et al.
U.S. Appl. No. 12/114,014, filed May 2, 2008, Bennett, et al.

* cited by examiner

UNIFIED USER IDENTIFICATION WITH AUTOMATIC MAPPING AND DATABASE ABSENCE HANDLING

The present U.S. patent application is a Continuation of U.S. patent application Ser. No. 13/768,127, filed on Feb. 15, 2013, and published as U.S. Publication 20130159349-A1 on Jun. 20, 2013, which is a Continuation of U.S. patent application Ser. No. 13/425,019, filed on Mar. 20, 2012, and issued as U.S. Pat. No. 8,447,780 on May 21, 2013, which is a Continuation of Ser. No. 13/287,189, filed on Nov. 2, 2011, and issued as U.S. Pat. No. 8,180,794 on Mar. 15, 2012, which is a Continuation of U.S. patent application Ser. No. 12/549,205, filed on Aug. 27, 2009, and issued as U.S. Pat. No. 8,086,633 on Dec. 27, 2011, and Claims priority thereto under 35 U.S.C. §120.

BACKGROUND OF THE INVENTION

1. Field of the Invention

The present invention is related to security authentication in computer systems, and more specifically to an authentication system that provides unified user identification across multiple namespaces.

2. Description of Related Art

In networked computer systems, and in particular, in heterogeneous networking environments across multiple operating systems, entity authentication presents a management challenge. Entities, or in the present context, security principals, may be individual users, groups, particular machines, and the like. Entities are typically externally identified by a user ID or name that provides a symbolic tag, but internally, a numeric tag is typically associated with the entity as a practical measure. The numeric tag then provides a uniform identifier in the particular environment, such as security identifier objects (SIDs) used in Microsoft WINDOWS, or group and user identifiers as used in UNIX-type operating systems. (UNIX is a trademark of The Open Group.) Application programming interfaces (APIs) that access secured objects generally require such a numeric tag as an input, either directly or implicitly, as do gateways such as network portals.

Typically, an external database is used to map an entity identifier from one namespace to all of the various namespaces that the entity might encounter. An entity should be able to access the same set of objects irrespective of the operating system, network, machine, etc. from which an access occurs. Therefore, a large number of mappings may be required to and from various namespaces associated with various operating systems, machines and in some instances particular sub-systems or applications. Such identifier mappings have several drawbacks. First, the database must typically be fully populated before use, which is a labor-intensive process and has a high barrier to entry. Second, the reliance on an external database is a security vulnerability that is continuously exposed. Finally, it is frequently impractical to query a platform-specific database from a different platform, making the interface to the external database awkward for at least some of the access paths.

Therefore, it would be desirable to provide an identification method and system that provides uniform identification, can provide automatic population of identifiers and that adapts easily to access paths from different platforms.

BRIEF SUMMARY OF THE INVENTION

The invention is embodied in a computer-performed method, computer program product and computer system that authenticates entities generating accesses in a computer system.

Accesses to objects or gateways in the computer system, which may be a network of computers executing different operating systems, is made using canonical identifiers from a single namespace. Accesses directly specifying an identifier from the canonical namespace are made directly, while accesses made with identifiers from other namespaces are looked up in a external mapping database to obtain corresponding identifiers in the canonical namespace. If the external mapping database is not available or the identifier is not already present, a new identifier is automatically generated and used for the present access, and generally an entire session. The automatically-generated identifier is stored in an internal database and used for subsequent accesses by the same entity, making it possible to automatically populate the canonical namespace. The external database, if available, can be periodically polled to determine if the entity obtains an identifier in the same namespace mapped to by an automatically generated mapping, indicating a conflict. The external database lookup results are used to resolve the conflict.

Accesses to objects or gateways requiring an identifier from another particular namespace may be handled by a database lookup that obtains an identifier in the particular namespace that corresponds to the identifier from the canonical namespace. Alternatively, a generic identifier from the particular namespace may be assigned to all accesses from the canonical namespace.

The foregoing and other objectives, features, and advantages of the invention will be apparent from the following, more particular, description of the preferred embodiment of the invention, as illustrated in the accompanying drawings.

BRIEF DESCRIPTION OF THE SEVERAL VIEWS OF THE DRAWING

The novel features believed characteristic of the invention are set forth in the appended claims. The invention itself, however, as well as a preferred mode of use, further objectives, and advantages thereof, will best be understood by reference to the following detailed description of the invention when read in conjunction with the accompanying Figures, wherein like reference numerals indicate like components, and:

DETAILED DESCRIPTION OF THE INVENTION

The present invention relates to computer security systems, and specifically identification of entities, including users, groups, and the like between systems and software requiring identifiers from differing namespaces. A canonical namespace is managed such that a fail-free path is provided for accesses made via identifiers from other namespaces. When an identifier from another namespace is used for the access, an external mapping database is consulted to determine if a corresponding identifier from the canonical namespace is present in the external database. If the external database is not available, or the corresponding identifier is not present in the external database, an identifier in the canonical namespace is automatically generated. The generated identifiers are stored in an internal database, making it possible to populate the internal database automatically. Accesses requiring identifiers from another namespace can be made using a canonical identifier to look up corresponding identifiers in the other namespace, or by assigning a generic identifier in the another namespaces to identifiers in the canonical namespace. The external database can be periodically polled to discover any new or changed mappings for identifiers of interest. If a new or changed external mapping is discovered that conflicts with an existing automatically generated mapping stored in the internal database, the external mapping is used.

Figure 1:
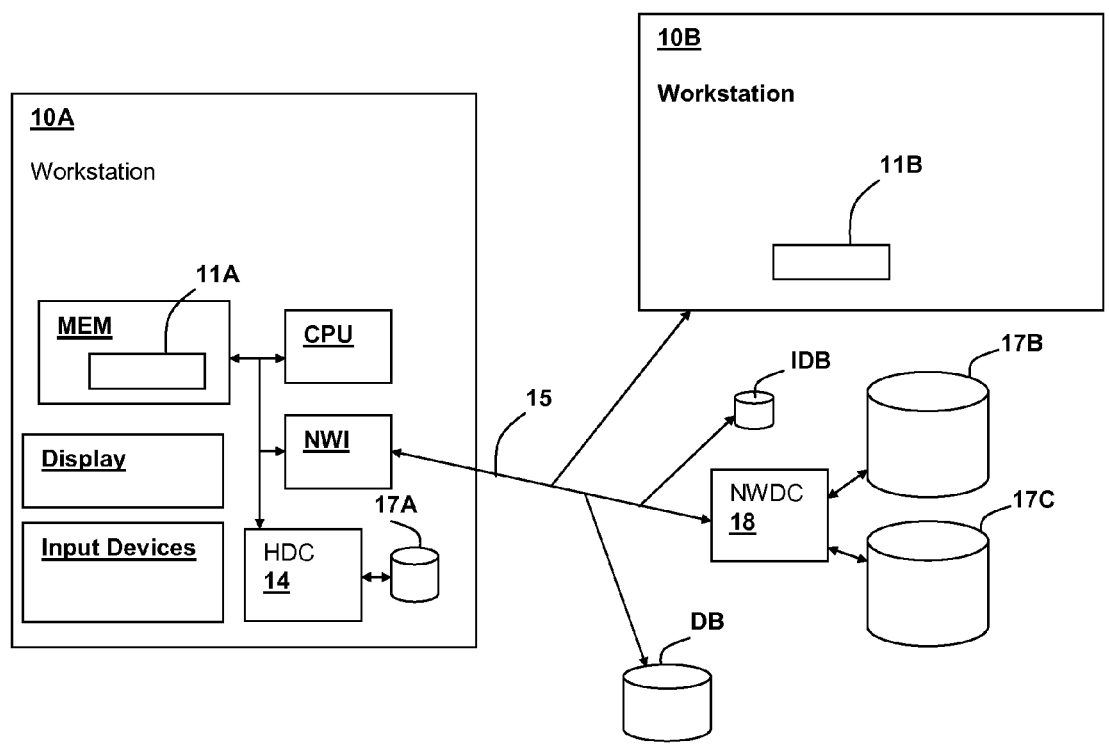
FIG. 1 is a block diagram illustrating a networked computer system in which techniques according to an embodiment of the present invention are practiced.

Referring now to FIG. 1, a networked computer system in which an embodiment of the present invention is practiced is depicted in a block diagram. A first workstation computer system 10A includes a processor CPU coupled to a memory MEM that contains program instructions for execution by CPU, including a virtual file system (VFS) interface 11A, which provides a native file system interface to the particular operating system executed by workstation computer system 10A, for example the WINDOWS operating system. Workstation computer 10A is also depicted as including a graphical display Display and input devices Input Devices, such as mice and keyboards, for interacting with user interfaces including login screens and other user interfaces for interacting with other computers connected to the network, for example, administration screens for administering identification and authorization profiles used by the techniques of the present invention.

Workstation computer system also includes a hard disc controller HDC 14 that interfaces processor CPU to local storage device 17A and a network interface that couples workstation computer system 10A to network 15, which may be fully wireless, fully wired or any type of hybrid network. VFS interface 11A provides a uniform set of application programming interfaces (APIs) that provide access to resources, such as local storage 17A or remote storage such as storage devices 17B and 17C, which are coupled to network 15 by network disc controller (NWDC) 18. An external mapping database DB, external to the VFS, provides storage for traditional administrative mapping information as will be described in further detail below, and which may be a single database, or comprise multiple databases. An internal mapping database IDB provides for storage of automatically-generated identifier mappings and is internal to the VFS, which means that internal database IDB is owned by the VFS and is not generally accessible to other sub-systems. Another workstation computer system 10B, having an internal organization similar to that depicted in workstation computer system 10A, is coupled to network 15 and executes a different operating system, e.g., UNIX. A different VFS client 11B is provided and executed within workstation computer system 10B to provide suitable native APIs for accessing storage within workstation computer system 10B, networked storage devices 17B and 17C, as well as storage device 17A within workstation computer system 10A, if storage device 17A is shared.

Network 15 may include wireless local area networks (WLANs), wired local-area networks (LANs), wide-area networks (WANs) or any other suitable interconnection that provides communication between workstation computer systems 10A and 10B, storage devices 17A-17C, external database DB and any other systems and devices coupled to network 15. Internal database IDB is generally a file stored within a storage device, such as one of storage devices 17A-17C, and is thereby accessible by file system interface objects 11A and 11B over network 15. Further, the present invention concerns identification functionality that is not limited to a specific computer system or network configuration. Finally, the specification workstation computer systems 10A and 10B and the location of their specific memory MEM and file system interface objects 11A and 11B does not imply a specific client-server relationship or hierarchical organization, as the techniques of the present invention may be employed in distributed systems in which no particular machine is identified as a server, but at least one of the machines provides an instance and functionality of an object or interface that performs identification in accordance with an embodiment of the present invention. The objects or interfaces process accesses according to methods and structures of the present invention, as described in further detail below.

Figure 2:
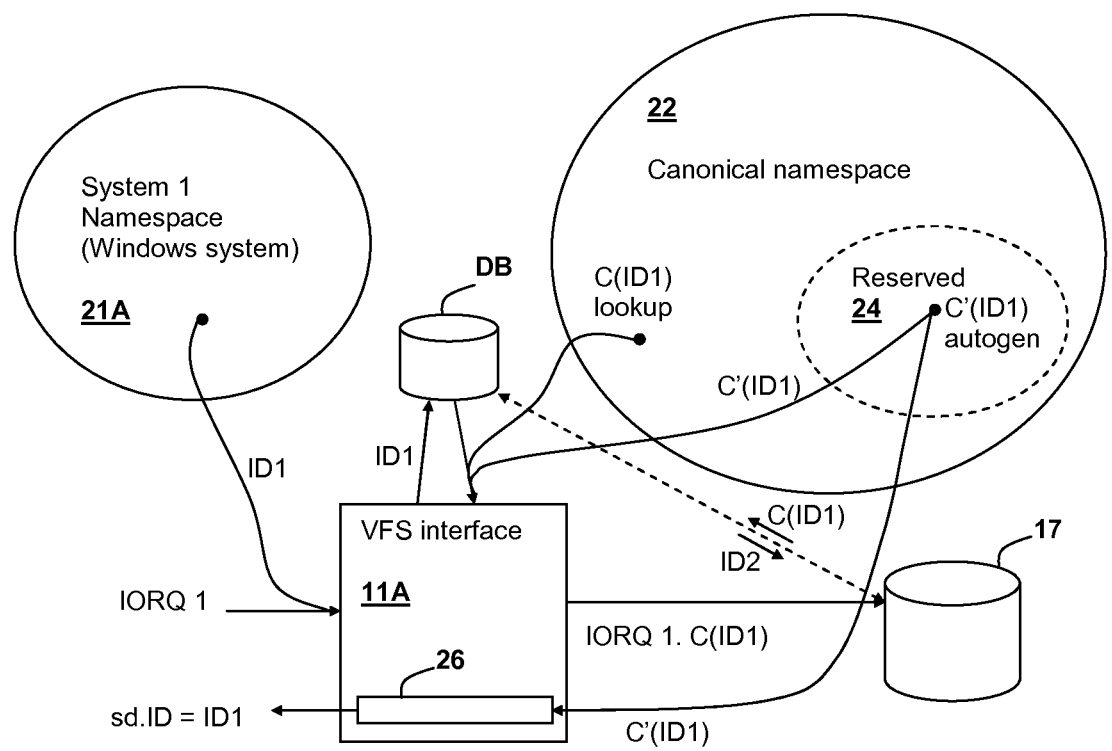
FIG. 2 is a pictorial diagram showing accesses to objects and the relationship of identifier namespaces within the system of FIG. 1.

Referring now to FIG. 2, a pictorial diagram illustrating a relationship between identifiers and interfaces within the system of FIG. 1 is shown. The depicted structure is only one of many possible program structures for implementing the identification methodology described herein, and is provided as an example of an embodiment of a structure in accordance with an embodiment of the present invention, performing an exemplary set of accesses. An input/output request (IORQ) IORQ 1 is received at VFS interface 11A and has associated with it, an entity identifier ID1 from system 1 namespace 21A, e.g., a security identifier (SID) as is used in Windows operating systems. In the example, I/O request IORQ 1 targets storage device 17, which contains a UNIX-based file system image. In order to access target storage device 17, a suitable identifier must be provided when VFS interface 11A passes I/O request IORQ 1 along to the file system driver managing storage device 17. In order to provide the identifier, VFS interface 11A (or a remote object or service called by VFS interface 11A) queries database DB for an entry matching identifier ID1. If database DB is available, and the entry is present, the member C(ID1) of canonical namespace 22 corresponding to identifier ID1 is obtained from database DB1. Otherwise, a new identifier is automatically generated C'(ID1) in a reserved portion 24 of canonical namespace 22. In practice, identifiers such as identifier C'(ID1) are not generated for each access, rather internal database IDB stores all such automatically generated identifiers, so that subsequent accesses by the same entity will be mapped by internal database IDB directly to canonical namespace 22. A reserved portion 24 of canonical namespace 22 is used to ensure that no overlap of automatically-generated identifiers occurs with another identifier already being used, e.g., by a mapping in external database DB. In the exemplary embodiment, the automatically-generated identifiers are constructed by incrementing a counter, as other than the uniqueness of each identifier, no special significance nor information is contained in the identifier itself, only the mapping to the corresponding identifiers e.g. identifier ID1 in the other namespace(s) is important in general. However, alternative techniques such as hashing or other computation may be used to generate the automatically-generated identifiers. Once identifier C'(ID1) is generated, it is stored in internal database IDB for future use, since any files that become owned or are created by the entity identified by identifier C'(ID1) will require the owner.

In the depicted example, for generality, the file system driver managing storage device 17 is depicted as requiring identifiers from canonical namespace 22. However, under certain circumstances, an identifier from canonical namespace 22 or another namespace may be needed as a return value to the originating platform. For example, when a query from a WINDOWS operating system is made to obtain the owner of a file which in WINDOWS is a security identifier sd.SID. In order to provide a security identifier for a file having an owner identified only in canonical namespace 22, a conversion algorithm 26 may be used to generate an artificial, but compatible, security identifier sd.SID from canonical ID C'(ID1). Alternatively, a dummy or generic identifier compatible with namespace 21A may be provided from VFS interface 11A in response to a request for an owner identifier of a file whose owner is not identified in namespace 21A.

It is understood that the techniques illustrated above apply to object accesses in general, and storage devices/files are only an illustrative example of an object type for which access may be mapped according to embodiments of the present invention. Further, it is understood that the mapping provided by the above-described technique is not a 1:1 security mapping, but for automatically-generated identifiers, can provide some level of access, e.g., that level of access available to non-owner non-group members in UNIX. However, once the identifiers are populated in database DB in traditional administrative fashion, or automatically generated and stored in internal database IDB, permissions can be subsequently tailored to the entity's needs. For example, a user may access a UNIX storage device from a WINDOWS operating system temporarily, receiving access to directories such as /tmp via identifier ID1 mapped to automatically-generated canonical namespace identifier C'(ID1). Subsequently the entity can arrange for an administrator to set permissions for accessing /usr/entity1, providing the same permissions as entity1 has under their normal UNIX account, for example.

Figure 3:
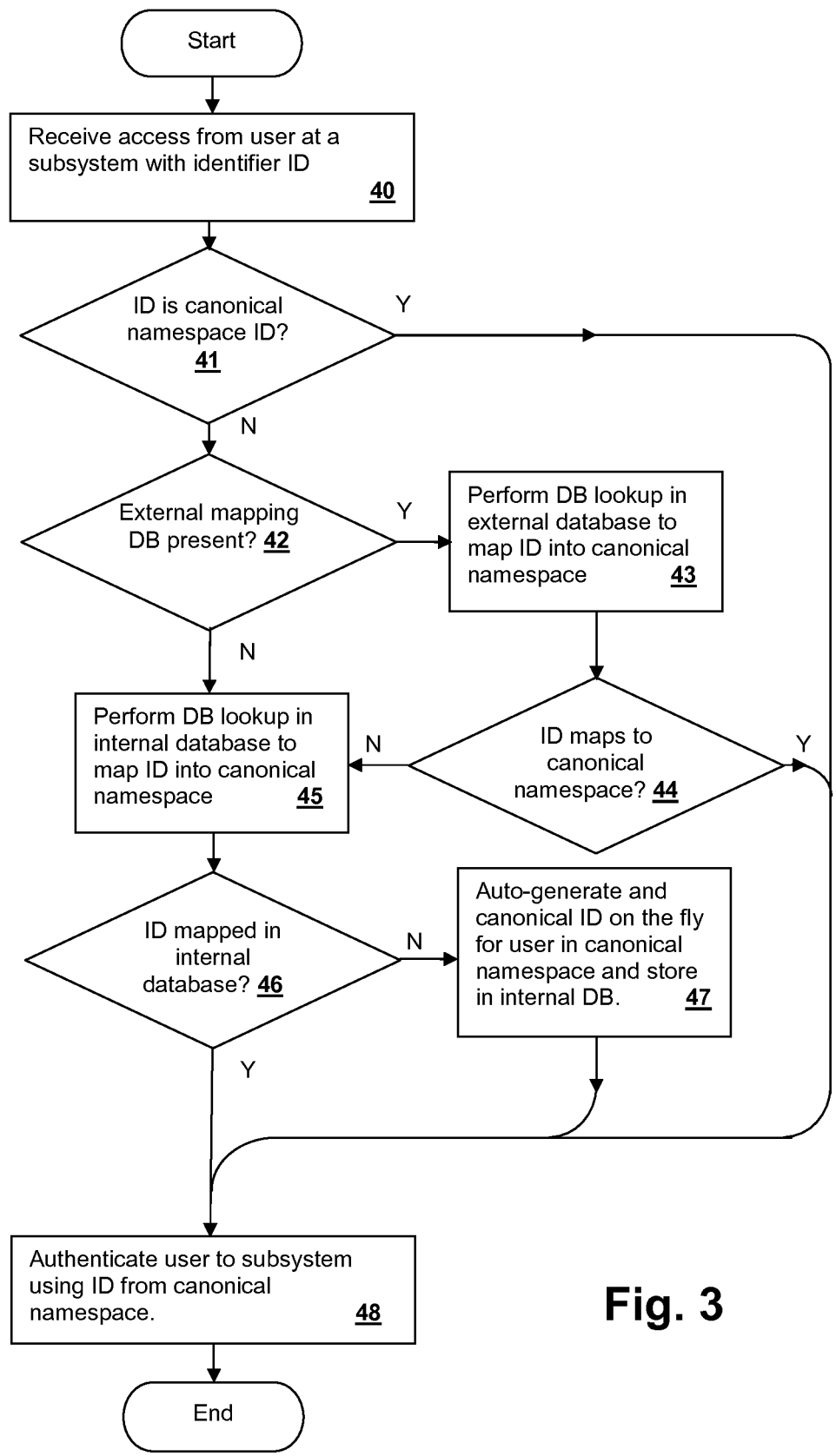
FIG. 3 is a flow chart of a method in accordance with an embodiment of the present invention.

Referring now to FIG. 3, a method in accordance with an embodiment of the present invention is illustrated in a flowchart. In the depicted method, an access attempt including an identifier ID is received by a subsystem (step 40). If the ID is from the canonical namespace (decision 41), then the access is made using the ID from the canonical namespace (step 48). (The illustrative embodiment of FIG. 3 presumes that the ultimate access is made from the canonical namespace, so no second lookup is required.) If the ID is not from the canonical namespace (decision 41), a check is performed to determine if external database DB is present (decision 42). If external database DB is present (decision 42), then a lookup is performed in database DB to obtain the corresponding identifier to identifier ID in the canonical namespace (step 43). If the ID maps to the canonical namespace (decision 44), then the access is made with the ID retrieved from database DB in the canonical namespace (step 48). If external database DB is not present (decision 42) or the ID is not mapped to the canonical namespace in external database DB (decision 44), then a lookup is performed in internal database to determine if a previously auto-generated mapping to the canonical namespace is already present for the entity (decision 46). If a previous auto-generated mapping exists (decision 46), the access is then made using the ID from the canonical namespace retrieved from internal database IDB (step 48). If a previous auto-generated mapping does not exist (decision 46), an ID in the canonical namespace is automatically generated for the entity and stored in internal database IDB (step 47), then the access is made using the new ID from the canonical namespace (step 48).

While the invention has been particularly shown and described with reference to the preferred embodiments thereof, it will be understood by those skilled in the art that the foregoing and other changes in form, and details may be made therein without departing from the spirit and scope of the invention.

What is claimed is:

1. A computer-performed method for controlling access to a resource in a computer system, the method comprising:

within the computer system receiving an internal input/output request to access a resource of the computer system, the request including a first identifier associated with an entity, wherein access to the resource requires a security identifier from a canonical namespace;

determining whether or not the first identifier is a member of the canonical namespace containing identifiers used to access resources in the computer system;

responsive to determining that the first identifier is a member of the canonical namespace, accessing the resource using the first identifier;

responsive to determining that the first identifier is not a member of the canonical namespace, whereby the first identifier is determined to not be an identifier that can be used to directly access the resource, determining whether the first identifier has a mapping to a second identifier that is a member of the canonical namespace, wherein the mapping is stored in an internal database;

responsive to determining that the first identifier is not a member of the canonical namespace and does have a mapping to the canonical namespace stored in the internal database, obtaining the second identifier for the entity within the canonical namespace from an entry in the internal database corresponding to the first identifier;

responsive to obtaining the second identifier from the entry in the internal database, accessing the resource using the second identifier;

responsive to determining that the first identifier is not a member of the canonical namespace, and does not have a mapping to the canonical namespace stored in the internal database, automatically generating a third identifier for the entity within the canonical namespace and storing the third identifier in the internal database for further identification of the entity; and responsive to generating and storing the third identifier, accessing the resource using the third identifier.

2. The computer-performed method of claim 1, wherein the receiving receives a request to access an resource not directly accessible using an identifier from the canonical namespace but otherwise accessible using a fourth identifier from another namespace, wherein the first identifier is a member of the canonical namespace, and wherein the method further comprises:

obtaining the fourth identifier in the another namespace using the first identifier; and responsive to obtaining the fourth identifier, accessing the object using the fourth identifier.

3. The computer-performed method of claim 2, wherein the obtaining comprises automatically generating the fourth identifier in the another namespace, wherein the fourth identifier is a unique identifier generated to correspond to the first identifier.

4. A computer system comprising:

a processor for executing program instructions; and a memory coupled to the processor for executing the program instructions, wherein the program instructions include program instructions for controlling access to a resource in the computer system, including program instructions that receive, within the computer system, an internal input/output request to access a resource, the request including a first identifier associated with an entity, wherein access to the resource requires a security identifier from a canonical namespace, program instructions that determine whether or not the first identifier is a member of the canonical namespace containing identifiers used to access resources in the computer system, program instructions that, responsive to determining that the first identifier is a member of the canonical namespace, access the resource using the first identifier, program instructions that, responsive to determining that the first identifier is not a member of the canonical namespace, whereby the first identifier is determined to not be an identifier that can be used to directly access the resource, determine whether the first identifier has a mapping to a second identifier that is a member of the canonical namespace, wherein the mapping is stored in an internal database of the computer system, program instructions that, responsive to determining that the first identifier is not a member of the canonical namespace and does have a mapping to the canonical namespace stored in the internal database, obtain the second identifier for the entity within the canonical namespace from an entry in the internal database corresponding to the first identifier, program instructions that, responsive to obtaining the second identifier from the entry in the internal database, access the resource using the second identifier, program instructions that, responsive to determining that the first identifier is not a member of the canonical namespace and does not have a mapping to the canonical namespace stored in the internal database, automatically generate a third identifier for the entity within the canonical namespace and store the third identifier in the internal database for further identification of the entity, and program instructions that, responsive to generating and storing the third identifier, access the resource using the third identifier.

5. The computer system of claim 4, wherein the program instructions for receiving receive a request to access a resource not directly accessible using an identifier from the canonical namespace but otherwise accessible using a fourth identifier from another namespace, wherein the first identifier is a member of the canonical namespace, and wherein the program instructions further comprise program instructions for:

obtaining the fourth identifier in the another namespace using the first identifier; and responsive to obtaining the fourth identifier, accessing the object using the fourth identifier.

6. The computer system of claim 5, wherein the program instructions for obtaining comprise program instructions for automatically generating the fourth identifier in the another namespace, wherein the fourth identifier is a unique identifier generated to correspond to the first identifier.

7. A computer program product comprising a computer-readable memory that is not a signal or a carrier wave storing program instructions for execution within a computer system, wherein the program instructions include program instructions for controlling access to a resource in the computer system, wherein the program instructions comprise program instructions for:

within the computer system, receiving an internal input/output request to access a resource, the request including a first identifier associated with an entity, wherein access to the resource requires a security identifier from a canonical namespace;

determining whether or not the first identifier is a member of the canonical namespace containing identifiers used to access resources in the computer system;

responsive to determining that the first identifier is a member of the canonical namespace, accessing the resource using the first identifier;

responsive to determining that the first identifier is not a member of the canonical namespace, whereby the first identifier is determined to not be an identifier that can be used to directly access the resource, determining whether the first identifier has a mapping to a second identifier that is a member of the canonical namespace, wherein the mapping is stored in an internal database;

responsive to determining that the first identifier is not a member of the canonical namespace and does have a mapping to the canonical namespace stored in the internal database, obtaining the second identifier for the entity within the canonical namespace from an entry in the internal database corresponding to the first identifier;

responsive to obtaining the second identifier from the entry in the internal database, accessing the resource using the second identifier;

responsive to determining that the first identifier is not a member of the canonical namespace and does not have a mapping to the canonical namespace stored in the internal database, automatically generating a third identifier for the entity within the canonical namespace and storing the third identifier in the internal database for further identification of the entity; and responsive to generating and storing the third identifier, accessing the resource using the third identifier.

8. The computer program product of claim 7, wherein the program instructions for receiving receive a request to access a resource not directly accessible using an identifier from the canonical namespace but otherwise accessible using a fourth identifier from another namespace, wherein the first identifier is a member of the canonical namespace, and wherein the program instructions further comprise program instructions for:

obtaining the fourth identifier in the another namespace using the first identifier; and responsive to obtaining the fourth identifier, accessing the object using the fourth identifier.

9. The computer program product of claim 8, wherein the program instructions for obtaining comprise program instructions for automatically generating the fourth identifier in the another namespace, wherein the fourth identifier is a unique identifier generated to correspond to the first identifier.

* * * * *